United States Patent Office 3,210,197
Patented Oct. 5, 1965

3,210,197
PROCESS OF PREPARING A FAT PRODUCT WHICH AFTER PLASTICIZING CAN BE USED AS A SPREADING, BAKING AND FRYING FAT, AND A PROCESS OF PREPARING A MARGARINE IN USING THIS FAT PRODUCT
Hendrik Galenkamp, Amsterdam, Netherlands, assignor to N.V. Verenigde Textiel- & Oliefabrieken Afd. Crok & Laan, Wormerveer, Netherlands, a limited-liability company of the Netherlands
No Drawing. Filed Oct. 2, 1962, Ser. No. 227,722
Claims priority, application Netherlands, Oct. 5, 1961, 269,947
12 Claims. (Cl. 99—122)

In general rather many fats of the coconut or palm kernel type, hardened or not are worked up into margarins. In the Netherlands up to 30% by weight (b.w.).

These fats have the purpose of giving body to the margarins prepared therewith, but are not suitable as such because the temperature range in which they are plastic is much too narrow. Therefore they are mixed, on the one hand with an oil hardened to a certain degree to change the temperature range in which they are plastic to a high temperature range; and on the other hand with a fatty oil to extend this range to lower temperatures. In this manner products are obtained, which in general differ from butter fat in respect to their melting behavior.

British patent specification 832,377 describes a method of preparing a fat mixture the melting behavior of which corresponds to that of butter fat by interesterification of mixtures of coconut or palm kernel fat with palm oil.

A disadvantage of butter and also of margarin is that the plasticity below room temperature and, especially at refrigerator temperature, is bad. Therefore, these products are difficult to spread at said temperatures.

It has now been found that a fat mixture can be prepared which, above room temperature, has a melting behavior similar to butter fat, but which unlike butter fat, upon cooling to refrigerator temperature becomes very little more concentrated with solid constituents so that the spreadability at low temperatures is very good. Such mixures may be obtained by mixing 15–30 parts by weight (p.b.w.) of a solid fat having the following composition of fatty acids:

| | Percent b.w. |
|---|---|
| Caprylic acid | 1–2 |
| Capric acid | 2–5 |
| Lauric acid | 55–38 |
| Myristic acid | 12–14 |
| Palmitic acid | 10–12 |
| Stearic acid | 20–29 | which fatty acids are at random distributed over the glycerol molecules, with 85–70 parts by weight (p.b.w.) of a fatty oil.

A solid fat which is used according to the invention has a very steep melting curve, as appears from the percentages by weight of solid material at different temperatures which are indicated in the table below:

| Temperature, ° C.: | Percent solid |
|---|---|
| 0 | 95–95 |
| 20 | 92–95 |
| 25 | 91–95 |
| 27½ | 86–95 |
| 30 | 70–95 |
| 32½ | 53–90 |
| 37½ | 2–28 |

In explanation of this table it is noted that a fat is a mixture of triglycerides which are partially solid and partially liquid. The amounts of triglycerides being present in the solid and liquid states are dependent among other factors on the temperature. In the column the percentages by weight of solid triglycerides are indicated at different temperatures.

The corresponding melting and solidification points are:

| | ° C. |
|---|---|
| Complete melting point | 38–42 |
| Softening point | 36–40 |
| Solidification point | 35–38 |

Such a product can be simply made by esterifying a fatty acid mixture of the above-mentioned composition with glycerol. Alternatively such a product can be obtained by interesterifying hardened palm kernel fat, alone or in admixture with hardened palm oil and removing the liquid portion from the interesterification product by fractionation, e.g., in using acetone as solvent. These products, mixed with a fatty oil, give a fat mixture meeting the above-indicated requirements.

The thus obtained final products have the following percentages by weight of solid material at different temperatures:

| Temperature, ° C. | Percent b.w. of solid | | |
|---|---|---|---|
| | Mixture with 85% of fatty oil | Mixture with 70% of fatty oil | Butter fat |
| 0 | 15–30 | 15–32 | 50 |
| 5 | 12–26 | 13–28 | 45 |
| 10 | 9–25 | 10–27 | 42 |
| 15 | 8–23 | 11–26 | 33 |
| 20 | 6–20 | 8–22 | 16 |
| 25 | 4–15 | 4–17 | 9 |
| 27½ | 2–10 | 3–14 | 7 |
| 30 | 1–8 | 2–10 | 5 |
| 32½ | 0–3 | 1–6 | 3 |
| 37½ | 0–1 | 0–1 | 0 |

It is apparent from the above-given table that in this manner a product is obtained with a very good melting behavior. The percentage of solid material at temperatures below room temperature in all mixtures is much lower than that of butter fat in the same temperature range, whilst above room temperature the melting behavior of the mixture is similar to that of butter. If necessary, the product can be given more body than that of butter above room temperature without the melting point becoming higher than the temperature of the human body.

After rapidly cooling under stirring, e.g., with the aid of a pressure cooler, the above-mentioned mixtures are excellent spreading fats which can also be used for baking and frying. Emulsified in the usual way and with the usual constituents these mixtures give a margarine which in a temperature range of 4–30° C. can be excellently spread and maintains the desired consistency.

An additional advantage of this process is that well spreadable products having a high linoleic acid content can be obtained by using a fat oil having a high linoleic acid content, e.g., corn oil, sun flower oil or safflower oil.

In this period of time in which many heart and vascular diseases occur, interest is focussed on these oils and are prescribed for patients having these diseases because they reduce the cholesterol content of the blood.

By mixing these oils with the above-mentioned fat mixtures, products are obtained with a high linoleic acid content, whilst they are adapted to the eating habits usual in Western Europe and the United States of America. Products of this composition also reduce the cholesterol level of the blood as could be shown by tests made by the Centraal Instituut voor Voedingsonderzoek at Utrecht.

*Example 1*

After suspending 0.2% of nickel catalyst in it, palm kernel fat is hardened at 180° C. with hydrogen gas until the iodine value is below 1. Thereupon the nickel is removed by filtration and the hardened product is interesterified by stirring it under nitrogen with 0.2% b.w. (of the amount of fat under treatment) of sodium methoxide at a temperature between 60 and 80° C. After ½ hour the catalyst is destroyed by stirring water into the reaction mixture. After a water layer has settled, this layer is removed and the fat is washed with water until the washings are neutral. Finally the fat is dried and deodorized.

The percentage by weight of solid triglycerides at different temperatures in the product obtained is as follows:

| Temperature, °C.: | Percent b.w. of solid |
|---|---|
| 0 | 70 |
| 20 | 66 |
| 25 | 46 |
| 27½ | 40 |
| 30 | 30 |
| 32½ | 17 |
| 37½ | 0 |

| | °C. |
|---|---|
| Complete melting point | 35.2 |
| Softening point | 34.0 |
| Solidification point | 31.9 |

Thereupon one can proceed as follows:

A. 400 g. of the product obtained is dissolved in 200 ml. of acetone and this solution is cooled under stirring to 0° C. and thereupon maintained at 0° C. during 1 hour. The material which has crystallized is sucked off on a Büchner funnel and washed with acetone of 0° C. The percentage by weight at solid material in the product obtained then is:

| Temperature, °C.: | Percent b.w. of solid |
|---|---|
| 0 | 95 |
| 20 | 92 |
| 25 | 91 |
| 27½ | 86 |
| 32½ | 53 |
| 37½ | 2 |

| | °C. |
|---|---|
| Complete melting point | 38.0 |
| Softening point | 36.4 |
| Solidification point | 36.0 |

The yield of this product amounts to 65%.

For the preparation of the desired product 20 p.b.w. of the latter product are mixed with 80 p.b.w. of e.g. soybean oil and plasticized by rapid cooling under stirring.

B. During the crystallization described under A, a by-product is obtained wtih the following physical constants:

| | °C. |
|---|---|
| Complete melting point | 23.0 |
| Softening point | 20.0 |

Percent solid at:
| | |
|---|---|
| 0° C. | 55 |
| 20° C. | 7 |
| Yield ___percent | 35 |

This portion of the interesterified palm kernel fat can be viewed a oil for the instant purposes. Consequently the interesterified palm kernel fat may be viewed as a mixture consisting of 65% of a solid fraction according to the invention and of 35% of a fatty oil. When 100 g. of this interesterified palm kernel fat is mixed with 225 g. of soybean oil a fat mixture according to the invention is also obtained. The solid material present in the portion of the interesterified hardened palm kernel fat which is liquid between 0 and 20° C. contributes so little to the percentage of solid material at said temperatures in the complete mixture that this contribution can be neglected.

*Example 2*

Example 1 was repeated starting from a mixture of 90% b.w. of palm kernel fat and 10% b.w. of palm oil. First the mixture is again hardened until the iodine value is below 1. Thereupon the product is interesterified. It then has the following properties:

| Temperature, °C.: | Percent b.w. of solid |
|---|---|
| 0 | 74 |
| 20 | 67 |
| 25 | 56 |
| 27½ | 51 |
| 30 | 45 |
| 32½ | 34 |
| 37½ | 1 |

| | °C. |
|---|---|
| Complete melting point | 37½ |
| Softening point | 36.8 |
| Solidification point | 34.0 |

By fractionation a solid product is obtained in a yield of 72% with the following properties:

| Temperature, °C.: | Percent b.w. of solid |
|---|---|
| 0 | 95 |
| 20 | 95 |
| 25 | 95 |
| 27½ | 93 |
| 30 | 91 |
| 32½ | 81 |
| 37½ | 18 |

| | °C. |
|---|---|
| Complete melting point | 41.0 |
| Softening point | 39.0 |
| Solidification point | 38.0 |

20 p.b.w. of this fraction, mixed wtih 80 p.b.w. of soybean oil gave a product with the following properties:

| Temperatures, °C.: | Percent of solid |
|---|---|
| 0 | 20 |
| 5 | 18 |
| 10 | 18 |
| 15 | 16 |
| 20 | 13 |
| 25 | 9 |
| 27½ | 6 |
| 30 | 4 |
| 32½ | 2 |

| | °C. |
|---|---|
| Complete melting point | 32.0+2 |
| Softening point | 30.0+2 |

The same result can also be obtained by mixing the interesterification product completely with soybean oil in the ratio of 100 g. of interesterification product per 260 g. of soybean oil.

I claim:

1. A process for preparing an edible fat product which comprises (1) esterifying a mixture of fatty acids with glycerol, said mixture of fatty acids having the following composition:

| | Percent by weight |
|---|---|
| Caprylic acid | 1–2 |
| Capric acid | 2–5 |
| Lauric acid | 55–38 |
| Myristic acid | 12–14 |
| Palmitic acid | 10–12 |
| Stearic acid | 20–29 | to form a solid fat in which the fatty acids are randomly distributed over the glycerol molecules; and (2) admixing 15 to 30 parts by weight of said solid fat with 70 to 85 parts by weight of a polyunsaturated vegetable oil.

2. A process for preparing an edible fat product which comprises (1) interesterifying a member selected from the class consisting of palm kernel fat hardened to an iodine value below 1 and palm kernel fat in admixture with palm oil the mixture being hardened to an iodine value below 1, and fractionating the interesterification product to obtain a solid fat fraction said solid fat fraction having a complete melting point between 38 to 42° C., a softening point between 36 and 40° C. and a solidification point between 35 to 38° C.; and (2) admixing about 15 to about 30 parts by weight of said solid fat fraction with about 70 to about 85 parts by weight of a polyunsaturated vegetable oil.

3. A process for preparing an edible fat product which comprises (1) interesterifying a member selected from the class consisting of palm kernel fat hardened to an iodine value below 1 and palm kernel fat in admixture with palm oil said mixture being hardened to an iodine value below 1 to form an interesterification product, said interesterification product containing a solid portion having a complete melting point of from 38 to 42° C., a softening point of from 36 to 40° C. and a solidification point of from 35 to 38° C.; and (2) mixing about 30 parts by weight of said interesterification product with about 70 parts by weight of a polyunsaturated vegetable oil.

4. A process as in claim 2 in which the fatty oil is a member selected from the class consisting of corn oil, sun flower oil and safflower oil.

5. A process as in claim 3 in which the fatty oil is a member selected from the class consisting of corn oil, sun flower oil and safflower oil.

6. An edible composition of matter which comprises 15 to 30 parts by weight of a solid fat having the following fatty acid composition:

| | Percent by weight |
|---|---|
| Caprylic acid | 1–2 |
| Capric acid | 2–5 |
| Lauric acid | 55–38 |
| Myristic acid | 12–14 |
| Palmitic acid | 10–12 |
| Stearic acid | 20–29 | and in which the fatty acids are randomly distributed over the glycerol molecules in admixture with 70 to 85 parts by weight of a polyunsaturated vegetable oil.

7. An edible fat product which consists essentially of about 15 to about 30 parts by weight of the solid fat fraction having a complete melting point of from 38 to 42° C., a softening point of from 36 to 40° C. and a solidification point of from 35 to 38° C. obtained by fractionating the interesterification product of a member selected from the class consisting of palm kernel fat hardened to an iodine value below 1 and palm kernel fat in admixture with palm oil said mixture being hardened to an iodine value below 1, and from about 70 to about 85 parts by weight of a polyunsaturated vegetable oil.

8. An edible fat product which consists essentially of about 30 parts by weight of the interesterification product of a member selected from the class consisting of palm kernel fat hardened to an iodine value below 1 and palm kernel fat in admixture with palm oil said mixture being hardened to an iodine value below 1, said interesterification product containing a solid fat fraction having a complete melting point between 38 to 42° C., a softening point between 36 to 40° C. and a solidification point between 35 to 38° C., and about 70 parts by weight of a polyunsaturated vegetable oil.

9. A composition as in claim 7 wherein the fatty oil is a member selected from the class consisting of corn oil, sun flower oil and safflower oil.

10. A composition as in claim 8 wherein the fatty oil is a member selected from the class consisting of corn oil, sun flower oil and safflower oil.

11. In a margarine composition comprising fat, emulsifier, lecithin, color and aqueous solution, the improvement which comprises utilizing a the fat phase a composition of claim 7.

12. In a margarine composition comprising fat, emulsifier, lecithin, color and aqueous solution, the improvement which comprises utilizing as the fat phase a composition of claim 8.

References Cited by the Examiner
UNITED STATES PATENTS

| 2,442,532 | 6/48 | Eckey | 99—118 |
| 2,874,056 | 2/59 | Drew | 99—118 |
| 3,006,771 | 10/61 | Babayan | 99—118 |
| 3,099,564 | 7/63 | Gooding | 99—122 |

FOREIGN PATENTS 832,377  4/60  Great Britain.

OTHER REFERENCES

Bailey, "Industrial Oil and Fat Products," 1951, Interscience Publishers, Inc., N.Y., page 276.

A. LOUIS MONACELL, *Primary Examiner.*

ABRAHAM H. WINKELSTEIN, *Examiner.*